United States Patent [19]

Idogaki et al.

[11] Patent Number: 4,644,211

[45] Date of Patent: Feb. 17, 1987

[54] ELECTRIC ROTARY DRIVE APPARATUS OPERABLE IN A MAGNETIC CYLINDER

[75] Inventors: Takaharu Idogaki, Okazaki; Hisasi Kawai, Toyohashi; Ikuo Hayashi, Nishio, all of Japan

[73] Assignee: Nippon Soken, Inc., Nishio, Japan

[21] Appl. No.: 766,785

[22] Filed: Aug. 19, 1985

[30] Foreign Application Priority Data

Sep. 21, 1984 [JP] Japan ............................... 59-196550

[51] Int. Cl.[4] ............................................ H02K 33/12

[52] U.S. Cl. ............................ 310/266; 310/40 MM; 310/156; 335/272

[58] Field of Search .............................. 188/299, 318; 310/40 MM, 49 R, 89, 154, 172, 254, 258, 83, 156, 266

[56] References Cited

U.S. PATENT DOCUMENTS

| | | | |
|---|---|---|---|
| 2,595,870 | 5/1952 | Morganson | 310/40 MM |
| 2,812,457 | 11/1957 | Crawford | 310/89 |
| 4,527,676 | 7/1985 | Emura et al. | 188/319 |
| 4,538,080 | 8/1985 | England | 310/154 |

FOREIGN PATENT DOCUMENTS

| | | | |
|---|---|---|---|
| 904140 | 2/1982 | U.S.S.R. | 310/49 R |

OTHER PUBLICATIONS

Lutz et al, "Low Inertia Stepper Motor, " IBM Tech. Disclosure Bulletin, vol. 20, No. 6, (Nov. 77), p. 2262.

*Primary Examiner*—Patrick R. Salce
*Assistant Examiner*—D. L. Rebsch
*Attorney, Agent, or Firm*—Cushman, Darby & Cushman

[57] ABSTRACT

A rotary drive apparatus includes: a bar yoke, a coil mounted on the bar yoke, and a cylindrical case, having a magnetic property for receiving the coil and the bar yoke therein. The cylindrical case has at least one salient-pole portion formed on the inside thereof in the vicinity of a portion where the coil is received. The rotary drive apparatus also includes a rotary member facing the salient-pole portion and spaced from the bar yoke and the salient-pole portion by a predetermined gap, so that the rotary member rotates between the bar yoke and the salient-pole portion, and is provided with at least one magnet having opposite magnetic polarities and arranged along the circumference of the rotary member and facing the salient-pole portion. The salient-pole portion, the magnet, and an end-of-the-yoke member form a magnetic circuit. The rotary member is rotated in response to magnetic flux generated at the end of the bar yoke by applying an electric current to the coil.

5 Claims, 10 Drawing Figures

ELECTRIC ROTARY DRIVE APPARATUS OPERABLE IN A MAGNETIC CYLINDER

BACKGROUND OF THE INVENTION

1. Field of the Invention

The present invention relates to a rotary drive apparatus for electronically controlling a rotary angle of a rotary body. More particularly, it relates to a rotary drive apparatus which can effectively operate, even inside a bar of magnetic material, such as a shock absorber for a vehicle.

2. Description of the Related Art

In a conventional electronically controlled suspension unit for a vehicle, the damping effect derived from oil contained in a cylinder of the suspension unit can be controlled by changing the flow area of orifices through which the oil flows. This control is attained by a motor rotating a rotary rod within a piston in the cylinder, thus moving a gear which controls the opening and closing of a rotary valve to selectively communicate or not communicate with the orifice. However, torque generated by the motor is transfered to the far end of the piston through the rotary rod, and therefore, the sealing and controllability of the system become difficult.

To alleviate this problem, an actuator is incorporated within the piston rod. Since the piston rod is a part of the suspension unit, preferably a rotary-type actuator without a spring is incorporated, to lessen the effects of vibration thereon.

In the above case, the actuator incorporated within the piston rod is usually a conventional rotary solenoid, which includes coils, an iron yoke, yoke magnetic poles, and permanent magnets—all of which are fitted into holes made inside the piston rod. In this construction, the coil is energized to generate magnetic poles at the yoke magnetic poles. However, in this conventional construction, the problem arises wherein, if the above structure is inserted into the piston rod, the magnetic poles are short-circuited because the piston rod is made of a magnetic material, and thus the magnetic poles cannot produce an effective magnetic field for the permanent magnets to rotate same.

To overcome this problem, it has been proposed to divide the yoke into separate yokes, and to wind the coils around each of the yokes separately. However, this produces the problem of allowing more space for the coil windings, and of the smaller size of yokes made necessary by space limitations.

The above conventional structures will be explained later in more detail, with reference to the attached drawings.

SUMMARY OF THE INVENTION

An object of the present invention is to provide a rotary drive apparatus having a simple construction and an excellent volumetric efficiency, which can be operated stably without being influenced by surrounding magnetic materials.

Another object of the present invention is to provide a rotary drive apparatus having an excellent volumetric efficiency adoptable as a rotary valve for an electronically controlled suspension of a vehicle without performing any special process on the rotary drive apparatus, by arranging a coaxial cylindrical coil to a piston rod of the rotary drive apparatus in such a manner that the rotary position of the rotary valve can be switched to at least three locations.

Still another object of the present invention is to provide a rotary drive apparatus which is easy to assemble and adjust.

According to the present invention, there is provided a rotary drive apparatus including: a bar yoke member; a coil mounted on the bar yoke member; and a cylindrical case member. The cylindrical case member has a magnetic property for receiving the coil and the bar yoke member therein. The cylindrical case member also has at least one salient-pole portion formed on the inside thereof in the vicinity of a portion where the coil means is received. The rotary drive apparatus also includes a rotary member facing the salient-pole portion and spaced from the bar yoke member and the salient-pole portion with a predetermined gap, so that the rotary member rotates between the bar yoke member and the salient-pole portion, and provided with at least one magnet having opposite magnetic polarities, arranged along the circumference of the rotary member and facing the salient-pole portion; the salient-pole portion in the cylindrical case member, the magnet arranged on the rotary member, and an end of the yoke member forming a magnetic circuit. The rotary member is rotated in response to magnetic flux generated at the end of the bar yoke member by applying an electric current to the coil means mounted on the bar yoke member.

BRIEF DESCRIPTION OF THE DRAWINGS

Other objectives and features of the present invention will be described below in detail with reference to the accompanying drawings, in which.

DESCRIPTION OF THE PREFERRED EMBODIMENTS

Before describing embodiments of the present invention, a detailed explanation will be given of conventional rotary drive apparatuses for a vehicle suspension unit.

Figure 1:
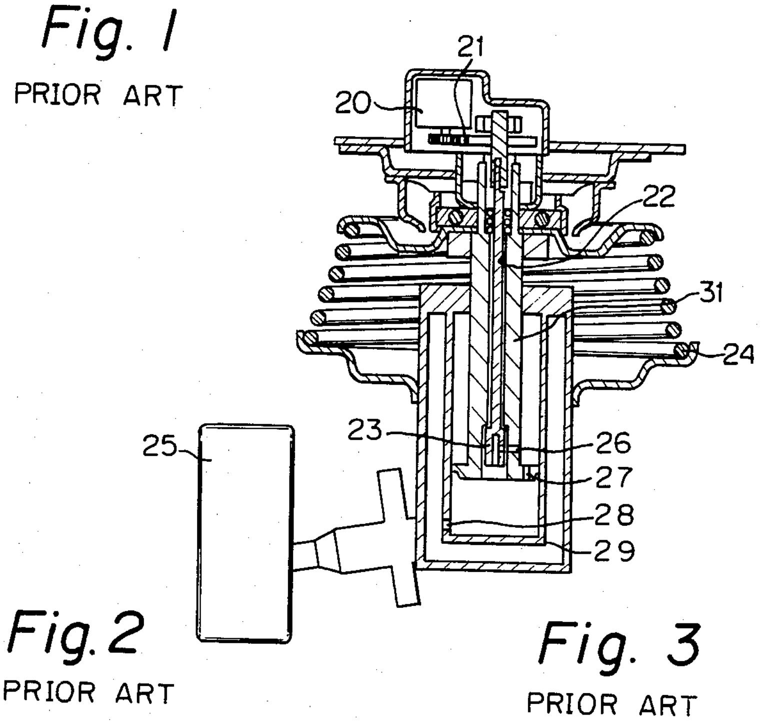
Fig. 1 PRIOR ART
FIG. 1 is a schematic view of a conventional electronically controlled suspension.

FIG. 1 is a sectional view of a conventional electronically controlled suspension. In FIG. 1, 20 represents a motor, 21 a gear, 22 a rotary rod mounted on a piston rod 31, 23 a rotary valve portion, 24 a spring, 26 a first orifice provided for the piston rod 31, 27 a second orifice, and 28 an orifice provided for a cylinder 29. The rotary rod 22 within the piston rod 31 is rotated by means of the motor 20 and the gear 21 to control an opening of the rotary valve 23 to communicate, or not communicate, with the orifice 26. As a result, the damping effect derived from oil contained in the cylinder 29 can be controlled by changing the flow area of orifice through which oil flows, for example, by changing the orifice from the orifice 27 only to both the orifices 26 and 27, etc. Since torque generated by the motor 20 and the gear 21 is transferred to the far end of piston rod 31 through the rotary rod 22, enormous efforts must be expended in order to maintain the sealing characteristic and the controllability of the system. Accordingly, an actuator must be incorporated within the piston rod 31. Since the piston rod 31 is used in a suspension unit, preferably a rotary type actuator without a spring is adopted as the incorporated actuator so that it is less affected by vibration.

Figure 2:
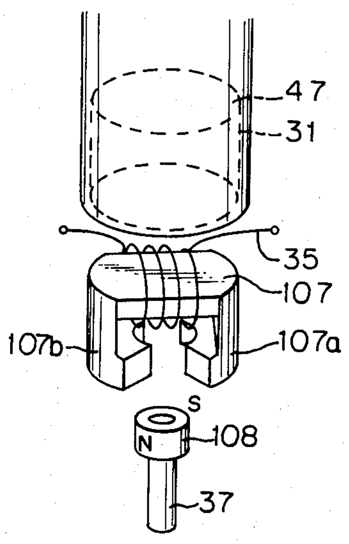
Fig. 2 PRIOR ART
FIG. 2 is a partial view of a conventional rotary drive apparatus incorporated in a piston rod shown in FIG. 1.
Figure 3:
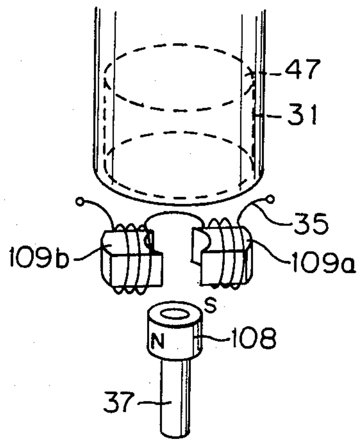
Fig. 3 PRIOR ART
FIG. 3 is a partial view of another conventional drive apparatus incorporated in the piston rod shown in FIG. 1.

Examples of conventional rotary drive apparatuses which have been designed to incorporate such piston rods are shown in FIGS. 2 and 3.

FIGS. 2 and 3 are perspective view of rotary solenoids having conventional structures to be installed in piston rods 31. In FIGS. 2 and 3, 107 represents an iron yoke, 107*a* and 107*b* yoke magnetic poles, 108 rotatable permanent magnets magnetized in diametral directions, 109*a* and 109*b* separated iron yokes, coils 35, shafts 37, and holes 47 formed inside the piston rods 31; coils 35, yoke 107, yoke magnetic poles 107*a* and 107*b* or separated yokes 109*a* and 109*b*, and permanent magnets 108 being inserted into the holes 47. In the structure shown in FIG. 2, the coil 35 is energized to generate magnetic poles at the yoke magnetic poles 107*a* and 107*b*. If the structure is inserted into the piston rod 31, the magnetic poles are magnetically short-circuited because the piston rod 31 is made of magnetic materials and thus the magnetic poles can not provide an effective magnetic field to the rotary magnet 108. This is a problem in the above conventional apparatus.

To overcome the problem, there has been proposed the structure shown in FIG. 3, wherein a yoke is divided into yokes 109*a* and 109*b*, and coils 35 are wound around each of the separated yokes. There is, however, still a problem in that there is little space for the windings of the coils 35 around the yokes due to a small diameter of the piston rod 31, which is about 25 mm, and due to the size of separated yokes 109*a* and 109*b* to be enclosed within the hole 47 of the piston rod 31.

Figure 4:
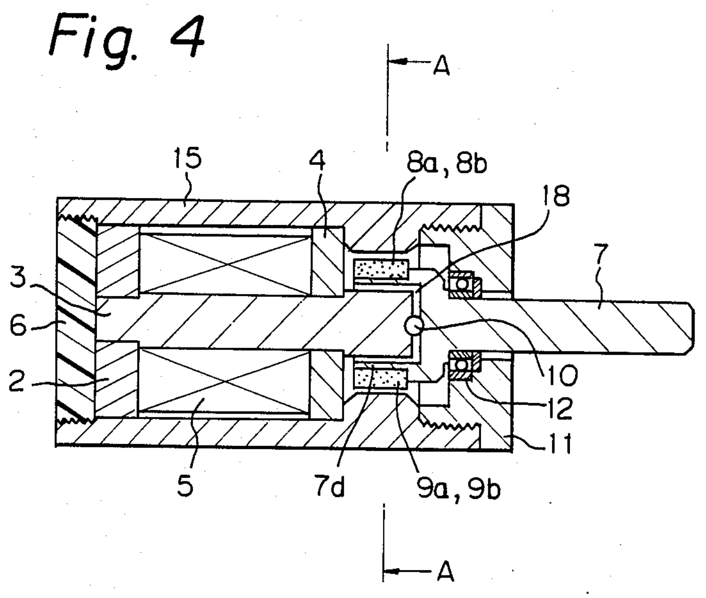
FIG. 4 is a longitudinal section view of a rotary drive apparatus according to an embodiment of the present invention.
Figure 5:
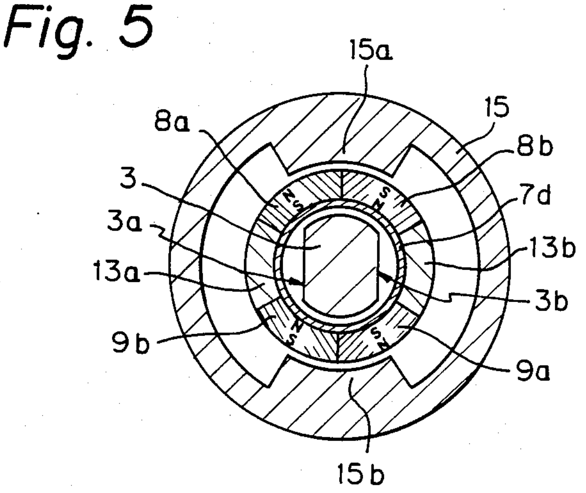
FIG. 5 is an enlarged sectional view along the line A—A shown in FIG. 4.

FIGS. 4 and 5 show a compact rotary drive apparatus of permanent magnet rotary type according to an embodiment of the present invention, and which can be used generally. FIG. 4 is a longitudinal section view, and FIG. 5 is an enlarged sectional view along the line A—A shown in FIG. 4, of the apparatus.

In FIGS. 4 and 5, iron casing 15 has a diameter which will allow it to be inserted into, for instance, a hole made in the piston rod 31 shown in FIG. 1. An iron yoke plate 2 has a disk-like shape and a through hole at its center. One end of a yoke core 3 having a substantially cylindrical shape is press-fitted into the through hole of the yoke plate 2. A disk-like bobbin plate 4 made of a nonmagnetic material such as aluminum is press-fitted onto the yoke core 3 at a position spaced apart from the upper end of the yoke core 3, to allow a coil 5 to be wound between the upper end of the yoke core 3 and the bobbin plate 4. As shown in FIG. 5, along the line A—A shown in FIG. 4, another end of the yoke core 3 is provided with flat cutout portions 3*a* and 3*b* in parallel to each other. The yoke plate 2, yoke core 3, and bobbin plate 4 form a coil bobbin which is insulated with resin, etc., and wound with the coil 5 between the yoke plate 2 and the disk-like bobbin plate 4. The coil 5 is fixed through the yoke plate 2 to resin end plate 6, at which lead wires (not shown) for energizing the coil 5 are connected to the coil 5. These lead wires are connected to a controlling circuit which will be described later. A coil assembly comprising the yoke plate 2, yoke core 3, bobbin plate 4, coil 5, and end plate 6 can be inserted into, for example, a coaxial cylindrical hole 47 made inside an iron piston rod 31, which end portion is shown in FIG. 2, and fixed thereto.

Numeral 7 represents a rotor shaft made of a nonmagnetic material such as stainless steel, and having a cylindrical shape. At one end of the rotor shaft 7, there is provided a coaxial cylindrical hole 18. The projected end of the yoke core 3 at which the cutout portions 3*a* and 3*b* are formed is arranged in the cylindrical hole 18. The yoke core 3 comes into contact with the rotor shaft 7 only via a steel ball 10. On the outer wall of a remaining outer circumference of the cylindrical hole 18 of the rotor shaft 7, a first pair of permanent magnets 8*a* and 8*b* and a second pair of permanent magnets 9*a* and 9*b* are adhered and fixed in such a manner that they form a circular shape, as shown in FIG. 5, these permanent magnets having the same magnetic power respectively. The pairs of magnets 8*a* and 8*b*, and 9*a* and 9*b* are respectively magnetized to provide a pair of magnets having opposite polarities. The pairs of magnets 8*a* and 8*b*, and 9*a* and 9*b* are spaced apart from each other by about 180° and fixed in such a manner that the pairs face each other. Nonmagnetic spacers 13*a* and 13*b* are fixed between the pairs of magnets 8*a* and 8*b* and 9*a* and 9*b*, respectively.

Numeral 11 represents an aluminum housing and numeral 12 represents a bearing axially supporting the shaft 7. The casing 15 has an annular shape and includes salient-pole portions 15*a* and 15*b* arranged on the internal circumference thereof in the vicinity of the cutout portions 3*a* and 3*b* of the yoke core 3, the salient-pole portions 15*a* and 15*b* being spaced apart by 180° and facing each other. The pairs of permanent magnets 8*a* and 8*b*, and 9*a* and 9*b* fixed to the rotor shaft 7 are rotatably arranged with a slight gap between them and the salient-pole portions 15*a* and 15*b* arranged on the internal circumference of the casing 15.

Figure 6:
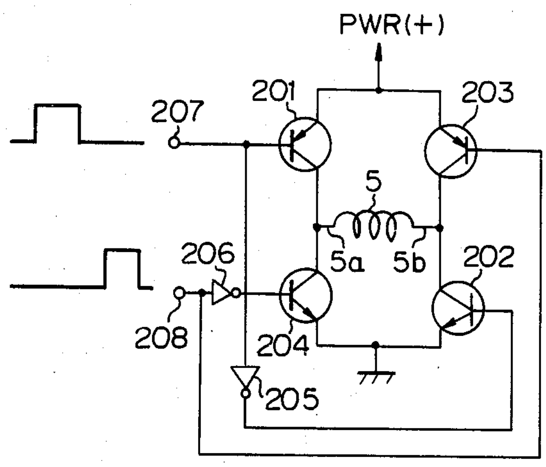
FIG. 6 is a view of an embodiment of a coil driving circuit adopted in a rotary drive controlling apparatus according to the present invention.

FIG. 6 is a diagram of a control circuit connected to the coil 5 shown in FIG. 4, to drive the rotary apparatus. In FIG. 6, numerals 201 and 203 represent PNP transistors, and numerals 202 and 204 represent NPN transistors. The emitter terminals of the transistors 201 and 203 are connected to the positive (+) terminal of a power source (PWR). The collector terminals of the transistor 201 and the transistor 204, and a common junction of the collector terminals of the transistors 201 and 204 and an end 5*a* of the coil 5 are connected. The collector terminals of the transistor 202 and the transistor 203, and a common junction of the collector terminals of the transistor 202 and 203 and another end 5*b* of the coil 5 are connected. The emittter terminals of the transistors 202 and 204 are both connected to ground. A first input terminal 207 is connected to the base of the transistor 201 and to the base of the transistor 202 via an inverter 205. A second input terminal 208 is connected to the base of the transistor 203 and to the base of the transistor 204 via an inverter 206.

When a driving signal is applied to the terminal 207 in the control circuit mentioned above, transistors 201 and 202 are turned ON to form a circuit comprising the power source (PWR), transistor 201, coil 5, transistor 202, and the ground, thereby energizing the coil 5. When the driving signal is applied to the terminal 208, transistors 203 and 204 are turned ON to form a circuit comprising the power source (PWR), transistor 203, coil 5, transistor 204, and the ground, thereby energizing the coil 5. As will be clearly understood, the direction of magnetic flux generated by the former energizing and the direction of magnetic flux generated by the latter energizing are opposite to each other. If a driving signal is not applied to both terminals, the coil 5 is not energized. As will be understood from the above description, the controlling circuit sets the coil 5 in three kinds of states, i.e., generating magnetic flux in a positive direction, generating magnetic flux in a negative direction, and generating no magnetic flux. As a result, the shaft 7 is rotated in one of a positive direction or in a negative direction, or kept in stationary state in response to the three kinds of states of the coil 5, which will be described later in detail.

The operation of the rotary drive apparatus will now be described with reference to FIGS. 4 to 6.

First, a state in which the coil 5 is not energized is described. The magnetic flux of a closed magnetic circuit formed by an N-pole of the magnet 8*a*, the salient-pole portion 15*a*, an S-pole of the magnet 8*b*, the yoke core 3, and the magnet 8*a*, and the magnetic flux of a closed magnetic circuit formed by an N-pole of the magnet 9*a*, the salient-pole portion 15*b*, an S-pole of the magnet 9*b*, the yoke core 3, and the magnet 9*a* have the same magnitude but opposite directions. Both magnetic flux generate detent torque so that the apparatus becomes stationary in a state shown in FIG. 5, i.e., a stabilized stationary position.

If the coil 5 is energized to generate a magnetic flux having a positive direction, a magnetic pole S appears, for example, at the end of the yoke core 3 in the vicinity of magnet pairs 8*a* and 8*b*, and 9*a* and 9*b*, and a magnetic pole N appears at the salient-pole portions 15*a* and 15*b*. In FIG. 5, a repulsive force is applied to the magnet 8*a* with respect to the N-pole of the salient-pole portion 15*a* of the casing 15 and thus torque is produced in an (counterclockwise) direction. At the same time, a pulling force is applied to the magnet 8*b* and thus torque is produced also in a counterclockwise direction. The facing salient-pole portion 15*b* and magnets 9*a* and 9*b* act in the same manner. The yoke core 3 is also provided with torque in an anticlockwise direction. As a result, the freely rotatable rotary shaft 7, to which pairs of magnets 8*a* and 8*b*, and 9*a* and 9*b* are fixed, rotates until the magnetic pole centers of the magnets 8*b* and 9*b* coincide substantially with the central portions of the salient-pole portions 15*a* and 15*b* located inside the casing 15, depending on the amount of electricity supplied to the coil 5, and the rotary shaft 7 becomes stable and stationary at that position. If the angle of arc of each of the salient-pole portions 15*a* and 15*b* is sufficiently larger than that of each of magnets 8*a*, 8*b*, 9*a*, and 9*b*, the magnetic flux from the N-pole of the magnet 8*a*, for example, reaches the S-pole of the magnet 8*b* via the salient-pole 15*a* when the coil 5 is de-energized. This is because the pairs of permanent magnets 8*a* and 8*b*, and 9*a* and 9*b* have opposite magnetic poles. Therefore, a magnetic return force is generated to bring the rotary shaft 7 to a position at which the permeance of the magnetic path is at a maximum value, i.e., the position shown in FIG. 5, and the rotary shaft 7 becomes stable and stationary at that position.

If an electric current is applied to the coil 5 in a reverse direction, the operation of the apparatus is the same as that mentioned in the above but the rotary shaft 7 is rotated by a specified angle in a reverse direction, i.e., a clockwise direction.

As mentioned above, the coil 5 is not arranged between the salient-pole portions 15*a* and 15*b* but in the vicinity thereof, and the magnetic circuit is formed via the yoke core 3. Thus, the dimension in a diametrical direction of the casing 15 provided with the salient-pole portions 15*a* and 15*b* is greatly reduced and the casing 15 is made more compact.

The magnetic circuit is formed by the end portion of the bar yoke core 3, magnet pairs 8*a* and 8*b*, and 9*a* and 9*b*, and salient-pole portions 15*a* and 15*b* so that the apparatus operates stably without being influenced by external magnetic materials. Further, the cutout portions 3*a* and 3*b* are provided for the yoke core 3. Due to the shapes and the magnetic force of the cutout portions 3*a* and 3*b*, salient-pole portions 15*a* and 15*b*, magnet pairs 8*a* and 8*b*, and 9*a* and 9*b*, and nonmagnetic spacers 13*a* and 13*b*, three stable and stationary positions are set so that the rotary shaft 7 will not be rotated excessively. As a result, a stopper is not specially required.

Since the rotational positions are determined in the manner mentioned above, the position alignment for fitting, assembling, and adjusting the apparatus is very easy, and if the apparatus is adopted as a shock absorber, it provides at least three steps of rotational angular control.

The rotary drive apparatus shown in FIGS. 4 and 5 can be inserted into the cylindrical hole 47 of the piston rod 31 received within the electronically controlled suspension system shown in FIG. 1, with the rotary shaft 7 provided with a valve forming means in such a manner that this means can form a rotary valve to be used for a shock absorber.

Figure 7:
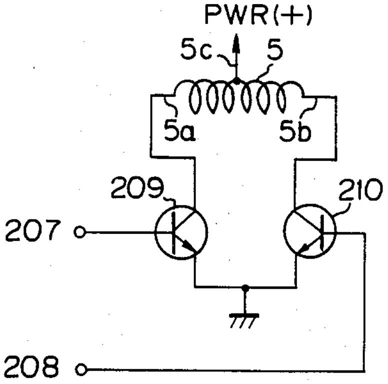
FIG. 7 is a view of another embodiment of a coil driving circuit adopted in the rotary drive controlling apparatus according to the present invention.

Many kinds of control circuits other than that shown in FIG. 6 can be adopted. FIG. 7 shows a circuit diagram of an embodiment of another control circuit according to the present invention.

In FIG. 7, an intermediate terminal 5*c* is provided as one of terminals of the coil 5 in addition to the terminals 5*a* and 5*b* provided at the ends of the coil 5. The numerals 209 and 210 represent NPN transistors, the emitter terminals of which are connected to ground. The collector terminal of the transistor 209 is connected to one end 5*a* of the coil 5, and the base thereof is connected to a first input terminal 207. The collector terminal of the transistor 210 is connected to another end 5*b* of the coil 5, and the base thereof is connected to a second input terminal 208. The intermediate terminal 5*c* of the coil 5 is connected to a positive (+) terminal of the power source (PWR).

When a driving signal is applied to the terminal 207 during operating the control circuit, the transistor 209 is turned ON to form a circuit comprising the power source (PWR), the left half of the coil 5, the transistor 209, and the ground, so that the left half of the coil 5 is energized. When the driving signal is applied to the terminal 208, the right half of the coil 5 is energized. The directions of the magnetic flux of the former and the latter are opposite to each other, as in the circuit shown in FIG. 6.

The operation of a rotary drive apparatus adopting the above control circuit is the same as that of the circuit described before.

The control circuit shown in FIG. 7 is simpler than the control circuit shown in FIG. 6. If the number of windings of the coil 5 and the amount of electricity supplied are the same in both cases, the torque of the circuit shown in FIG. 7 is half that of the circuit shown in FIG. 6. Therefore, the amount of electricity to be supplied to the circuit shown in FIG. 7 must be twice as large as that supplied to the circuit shown in FIG. 6, or the number of windings in the circuit shown in FIG. 7 must be twice as many as that in the circuit shown in FIG. 6, if the same torque as that of the circuit shown in FIG. 6 is required for the circuit shown in FIG. 7.

Figure 8:
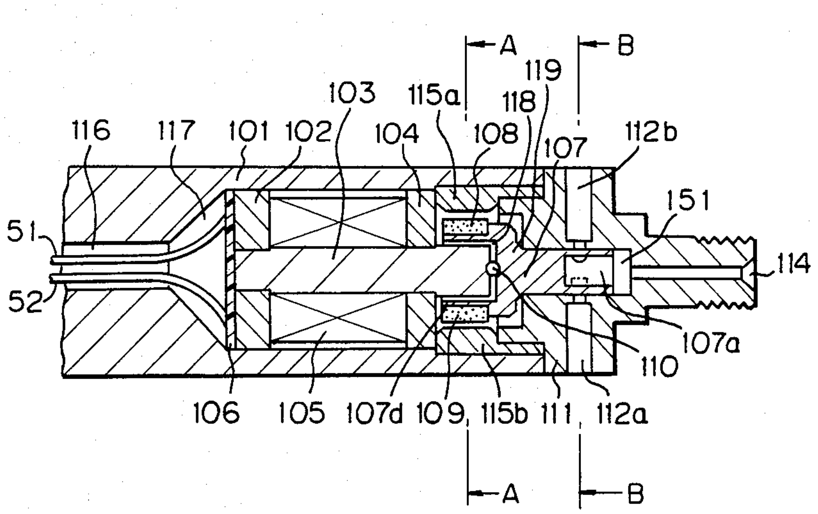
FIG. 8 is a longitudinal section view of a rotary drive apparatus according to another embodiment of the present invention.
Figure 9:
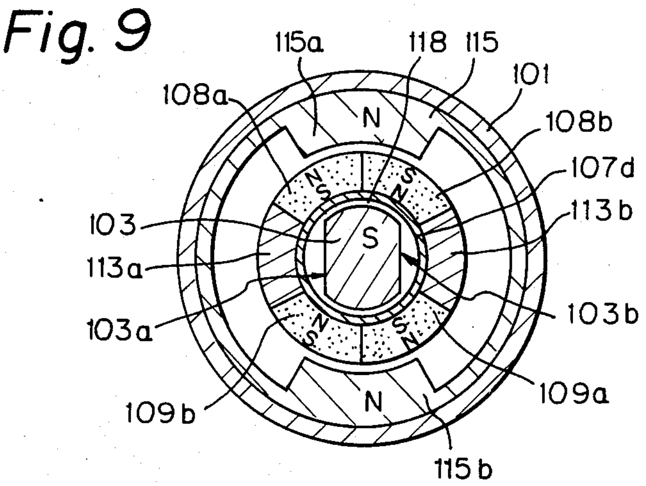
FIG. 9 is an enlarged sectional view along the line A—A shown in FIG. 8.
Figure 10:
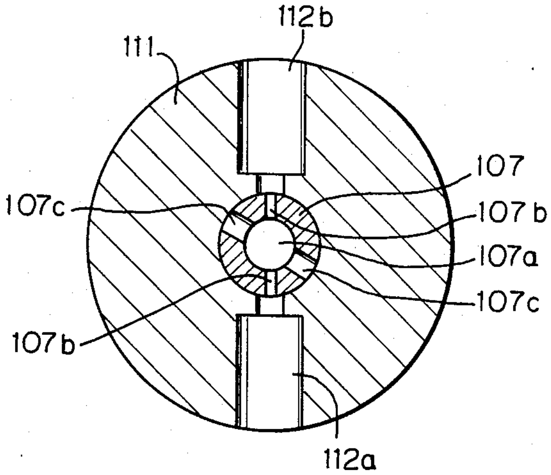
FIG. 10 is an enlarged sectional view along the line B—B shown in FIG. 8.

Another embodiment of the present invention is now explained with reference to FIGS. 8 to 10. This embodiment presents a rotary drive apparatus suitable for use as the electronically controlled suspension shown in FIG. 1. FIG. 8 is a longitudinal section view of the rotary drive apparatus, FIG. 9 is a cross sectional view along the line A—A shown in FIG. 8, and FIG. 10 is a cross sectional view along the line B—B shown in FIG. 8. FIGS. 9 and 10 are larger in scale than FIG. 8.

The rotary drive apparatus shown in FIGS. 8 to 10 has a similar rotational construction to that of the rotary drive apparatus shown in FIGS. 4 and 5, and communicates with the orifice system shown in FIG. 1.

In FIGS. 8 to 10, the numeral 101 represents an iron piston rod, which is a slender iron bar, received within the electronically controlled suspension system. The piston rod 101 is provided with a cylindrical hole 117 into which a rotary drive portion (to be explained later) is inserted, and a through hole 116 for the insertion of a feeder cable for supplying electricity to a coil 105.

Numeral 102 represents an iron yoke plate having a disk-like shape. An iron yoke core 103 having a substantially cylindrical shape is press-fitted into the yoke plate 102. A cylindrical bobbin plate 104 made of a nonmagnetic material such as aluminum is press-fitted onto the yoke core 103. At one end of the yoke core 103, flat cutout portions **103*a* and 103*b* are provided in parallel with each other, as shown in FIG. 9. A coil bobbin formed by the yoke plate 102, yoke core 103, and the bobbin plate 104 is insulated by resin, etc., and wound by a coil 105. Numeral 106 represents an end plate made of resin to which both ends of the coil 105 are fixed, and to which lead wires 51 and 52 for feeding electricity to the coil 105 are connected. The lead wires 51 and 52 are connected to the control circuit shown in FIG. 6 or 7. A coil subassembly comprising the yoke plate 102, yoke core 103, bobbin plate 104, coil 105, and end plate 106 is inserted into the coaxial cylindrical hole 117 made within the iron piston rod 101, and fixed thereto. The lead wires 51 and 52 are arranged in the through hole 116 which communicates with another end of the iron piston rod 101. The numeral 107 represents a rotor shaft made of a nonmagnetic material such as stainless steel and having a cylindrical shape, one end of which is provided with a coaxial cylindrical hole 118. The projected end having the cutout portions 103*a* and 103*b* of the yoke core 103 is arranged in the cylindrical hole 118. The yoke core 103 comes into contact with the rotor shaft 107 only through a steel ball 110. On the external wall of the remaining external circumference 107*d* of the cylindrical hole 118 of the rotor shaft 107, permanent magnet pairs 108*a* and 108*b*, and 109*a* and 109*b* are adhered and fixed in such a manner that they form a circular arc shape. The magnet pairs 108*a* and 108*b*, and 109*a* and 109*b* are respectively magnetized to have opposite magnetic polarities, spaced apart by about 180°, and fixed. Nonmagnetic spacers 113*a* and 113*b* are fixed between the magnet pairs 108*a* and 108*b*, and 109*a* and 109*b*, respectively. Numeral 119 represents a flange portion formed on the rotor shaft 107. At another end of the rotor shaft 107, a coaxial cylindrical hole 107*a* is formed, and through holes 107*b* and 107*c* having small-sized and large-sized diameters respectively are formed in diametrical directions to communicate with the cylindrical hole 107*a*. Numeral 111 represents an aluminum housing as a surrounding member. A cylindrical hole 151 is formed in the housing 111. A first opening 114 coaxial to the cylindrical hole 151 is formed to reach another end of the housing 111. Second and third openings 112*a* and 112*b* are made in diametrical directions, both of these openings communicating with the cylindrical hole 151. The rotor shaft 107 is inserted into the cylindrical hole 151 in such a manner that the rotor shaft 107 is rotatably supported by the cylindrical hole 151. The rotor shaft 107 is held toward a thrusting direction by the steel ball 110 and the flange portion 119. Iron yoke ring 115 has an annular shape, which has salient-pole portions 115*a* and 115*b* spaced apart by about 180° and facing each other. The yoke ring 115 is fixed to the housing 111 in advance, and the positional relationship between the salient-pole portions 115*a* and 115*b* and the second and the third openings 112*a* and 112*b* of the housing 111 is decided and fixed in such a manner that they are on the same longitudinal cross section, as shown in FIG. 10, for example. The yoke ring 115 and the housing 111 are fixed to the piston rod 101 by a caulking method, etc. The magnet pairs 108*a* and 108*b* and 109*a* and 109*b* fixed to the hollow end of the rotor shaft 107 at positions facing the salient-pole portions 115*a* and 115*b* are rotatably arranged with a slight gap between them and the salient-pole portions 115*a* and 115*b* on the internal circumference of the yoke ring 115**.

The control circuit shown in FIGS. 6 or 7 is connected via lead wires 51 and 52 to the coil 105.

As described above, the rotary drive portion of the rotary drive apparatus shown in FIGS. 8 to 10 is similar to that shown in FIGS. 4 and 5. Therefore, the explanation of the principle of the rotary drive of the apparatus shown in FIGS. 8 to 10 is omitted, as it is the same as that explained with reference to FIGS. 4 and 5.

The rotary drive apparatus shown in FIGS. 8 to 10 communicates with the orifices in response to the given rotation. The relation therebetween will be now explained.

If the apparatus is not energized, it is in a state shown in FIG. 10, wherein the cylindrical hole **107*a* communicates with openings 112*a* and 112*b* via the opening 107*b*. If the shaft 107 is rotated in an anticlockwise direction in the figure, the communication is disrupted. If the shaft 107 is rotated in a clockwise direction by about 45° from a state shown in FIG. 10, the cylindrical hole 107*a* communicates with openings 112*a* and 112*b* via the large-sized opening 107*c***.

When the apparatus is assembled as a shock absorber, the apparatus can be operated as a rotary valve in which at least three steps of damper switching control are possible.

Namely, the rotary drive apparatus shown in FIGS. 8 to 10 can replace the conventional electronically controlled suspension shown in FIG. 1, i.e., it can replace the motor 20, gear 21, rotary rod 22, and rotary valve 23.

The rotary drive apparatus shown in FIGS. 8 to 10 is compact in size, strong against vibration, and easy to seal.

If the positional relationship between the salient-pole portions 115*a* and 115*b* and, for example, the openings 112*a* and 112*b*, and the positional relationship between the permanent magnets 108*a*, 108*b*, 109*a*, and 109*b* and the holes 107*a*, 107*b*, 107*c*, and 107*d* provided to the shaft 107 are determined in advance in each of the subassemblies, the subassemblies can be assembled to a state shown in FIGS. 8 to 10 without the need to pay attention to their positional relationships, and thus the assembling and adjustment of the apparatus become easy to perform.

It is understood that many modifications other than the embodiments mentioned in the above can be achieved according to the present invention.

For example, although the angle of arc of each of the salient-pole portions 15*a* and 15*b*, or 115*a* and 115*b* of the casing 15 or the ring yoke 115 is made to be larger than the angle of arc of each of magnets, the angle can be made smaller so that two stationary positions are provided in a de-energized state, in which each of the magnet poles coincide with the center of each salient-pole portion. As a result, a two-position-switching type apparatus is realized by positive and negative energizing.

Further, although four circular magnets 8*a*, 8*b*, 9*a*, and 9*b* in FIG. 5 or 108*a*, 108*b*, 109*a*, and 109*b* in FIG. 9 are used in the embodiments, the number of magnets can be two or one, these magnet(s) being used to make substantially four poles by magnetization.

In addition, although three positions have been selected by turning ON and OFF an electric current, the rotational angle can be continuously controlled by a continuous current control. If the apparatus is applied for an electronically controlled suspension, it is possible to continuously control the damper constant of the suspension.

The rotary drive apparatus according to the present invention can be applied not only for the electronically controlled suspension but also for various other purposes.

Many widely different embodiments of the present invention may be constructed without departing from the spirit and scope of the present invention. It should be understood that the present invention is not limited to the specific embodiments described in this specification, except as defined in the appended claims.

We claim:

1. A rotary drive apparatus comprising:

a bar yoke member having an outer surface;

coil means, mounted on said bar yoke member so that at least one portion of said bar yoke member projects beyond a peripheral extent of said coil means, for generating magnetic flux when energized by an electric current;

a cylindrical case member, formed of a material having a magnetic property, for receiving said coil means at a first area therein and said bar yoke member therein, said cylindrical case member having at least a pair of salient-pole portions formed on an inside surface thereof in the vicinity of said first area where said coil means is received, said salient-pole portions facing each other through said one portion of said bar yoke member; and rotary means, provided between an inside of said salient-pole portions and said outer surface of said bar yoke member, and facing said salient-pole portions and spaced from said bar yoke member and said salient-pole portions by a predetermined gap, said rotary means for rotating between said bar yoke member and said salient-pole portions, and being provided with at least one magnet means having at least two pairs of outer-pole portions rigidly coupled to said rotary means and arranged along an outer circumference of said rotary means, each said outer-pole portion being magnetized to have an opposite polarity to an adjacent outer-pole portion, one of said outer-pole portions facing one of said salient-pole portions respectively, said one magnet means having at least two pairs of inner-pole portions arranged along an inner circumference thereof, and at inside portions corresponding to said outer-pole portions, said inner-pole portions being magnetized to have opposite polarities to a corresponding outer-pole portion, and said inner pole portions facing said bar yoke;

wherein said salient-pole portions in said cylindrical case member, said magnet means arranged on said rotary member and said one portion of said bar yoke member form a magnetic circuit, and wherein said rotary means is also for rotating in response to said magnetic flux generated at said one portion of said bar yoke member when an electric current is supplied to said coil means mounted on said bar yoke member, and said rotary member has at least three stopped positions.

2. A rotary drive apparatus according to claim 1, wherein said cylindrical case member is formed with two opposite salient-pole portions therein, said position of said bar yoke means which is inserted between said pair of salient-pole portions having a pair of cutout portions parallel to each other in the radial direction, and wherein said rotary means is rotated to one of said at least three stopped positions in response to a current which is applied to said coil means and which has one of a positive, negative and zero value.

3. A rotary drive apparatus according to claim 2, wherein said rotary means is formed with a first hole and at least one second hole spaced from said first hole in the radial direction, and wherein said rotary drive apparatus further comprises a housing member provided around an outer wall portion of said rotary means so as not to restrict free rotation of said rotary means, having a hermetic seal, and having at least one hole which selectively communicates with said second hole of said rotary means in response to a rotation of said rotary member.

4. A rotary drive apparatus according to claim 1, which further includes means for supplying an electric current to said coil means, which means includes first, second, third, and fourth switching elements, diagonally connected between said coil means, a current flowing through said first switching element, a terminal of said coil means, said coil means, another terminal, and said fourth switching element for generating a directional-magnetic flux in said coil means, and said current flowing through said second switching element, another terminal of said coil means, said coil means, a further terminal and said third switching element for generating a reverse-directional magnetic flux in said coil means.

5. A rotary drive apparatus according to claim 1, which further includes means for supplying an electric current to said coil means, which means includes first and second switching elements, wherein said coil means has an intermediate terminal between end terminals, and wherein the current flows through said first switching element, one end terminal of said coil means, a half of said coil means and said intermediate terminal for generating a directional-magnetic flux from said coil means in a first switching configuration and the current flows through said second switching element, another end terminal of said coil means, another half of said coil means and said intermediate terminal for generating a reverse-directional magnetic flux in said coil means in a second switching configuration.

* * * * *